(12) United States Patent
Hong et al.

(10) Patent No.: US 10,511,941 B2
(45) Date of Patent: Dec. 17, 2019

(54) METHOD FOR RECEIVING MULTICAST DATA AND APPARATUS THEREOF

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 112 days.

(21) Appl. No.: 15/674,702

(22) Filed: Aug. 11, 2017

(65) Prior Publication Data

US 2018/0049006 A1 Feb. 15, 2018

(30) Foreign Application Priority Data

Aug. 11, 2016 (KR) .................. 10-2016-0102624
Aug. 11, 2016 (KR) .................. 10-2016-0102625
(Continued)

(51) Int. Cl.
*H04W 4/06* (2009.01)
*H04L 29/08* (2006.01)
(Continued)

(52) U.S. Cl.
CPC .............. *H04W 4/06* (2013.01); *H04L 67/12* (2013.01); *H04L 67/32* (2013.01); *H04L 69/28* (2013.01);
(Continued)

(58) Field of Classification Search
None
See application file for complete search history.

(56) References Cited

U.S. PATENT DOCUMENTS

2009/0149164 A1  6/2009  Cai
2011/0194441 A1  8/2011  Jung et al.
(Continued)

FOREIGN PATENT DOCUMENTS

KR  10-2011-0093648 A  8/2011
KR  10-2012-0018818 A  3/2012
(Continued)

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 13)", 3GPP TS 36.321 V13.2.0 (Jun. 2016), pp. 1-91.

(Continued)

*Primary Examiner* — Anez C Ebrahim
(74) *Attorney, Agent, or Firm* — IP Legal Services, LLC

(57) ABSTRACT

A method may be provided for receiving multicast data by an IoT terminal requiring a low power and a low cost and an apparatus thereof. The method of a terminal may include starting a single cell-point to multipoint (SC-PTM) onduration timer through a MAC when discontinuous reception (DRX) is configured for a group-radio network temporary identifier (G-RNTI); monitoring a physical downlink control channel (PDCCH) during an active time; controlling at least one of the SC-PTM onduration timer and the SC-PTM inactivity timer when the PDCCH includes information indicating downlink transmission; and repeatedly receiving the multicast data through a physical downlink shared channel (PDSCH) of one or more subframes and an apparatus thereof.

20 Claims, 5 Drawing Sheets

(30) Foreign Application Priority Data

Nov. 3, 2016 (KR) ........................ 10-2016-0146056
Jun. 8, 2017 (KR) ........................ 10-2017-0071886

(51) Int. Cl.
*H04L 29/06* (2006.01)
*H04W 24/08* (2009.01)
*H04W 76/28* (2018.01)

(52) U.S. Cl.
CPC ............ *H04W 24/08* (2013.01); *H04W 76/28* (2018.02); *Y02D 70/00* (2018.01); *Y02D 70/10* (2018.01); *Y02D 70/12* (2018.01); *Y02D 70/122* (2018.01); *Y02D 70/126* (2018.01); *Y02D 70/1262* (2018.01); *Y02D 70/1264* (2018.01); *Y02D 70/20* (2018.01); *Y02D 70/21* (2018.01); *Y02D 70/24* (2018.01)

(56) References Cited

U.S. PATENT DOCUMENTS

| | | |
|---|---|---|
| 2011/0194478 A1 | 8/2011 | Lee et al. |
| 2011/0195668 A1 | 8/2011 | Lee et al. |
| 2012/0093051 A1 | 4/2012 | Xu |
| 2012/0287836 A1 | 11/2012 | Lee et al. |
| 2012/0300655 A1 | 11/2012 | Lee et al. |
| 2012/0314566 A1 | 12/2012 | Lee et al. |
| 2013/0176923 A1* | 7/2013 | Liu ........................ H04W 4/20 370/311 |
| 2014/0086152 A1 | 3/2014 | Bontu et al. |
| 2014/0242974 A1 | 8/2014 | Lee et al. |
| 2014/0355493 A1* | 12/2014 | Niu ........................ H04W 76/40 370/280 |
| 2015/0029867 A1 | 1/2015 | Jung et al. |
| 2015/0208462 A1* | 7/2015 | Lee .................. H04W 52/0212 370/311 |
| 2015/0281995 A1 | 10/2015 | Jung et al. |
| 2015/0359034 A1 | 12/2015 | Kim et al. |
| 2015/0373573 A1 | 12/2015 | Lee et al. |
| 2018/0167917 A1* | 6/2018 | Suzuki .................. H04W 72/04 |

FOREIGN PATENT DOCUMENTS

| | | |
|---|---|---|
| KR | 10-2012-0025538 A | 3/2012 |
| KR | 10-2015-0053812 A | 5/2015 |
| KR | 10-2015-0113168 A | 10/2015 |

OTHER PUBLICATIONS

Nokia et al., "Rel-14 NB-IoT and eMTC enhancement considerations", RP-161037, 3GPP TSG RAN Meeting #72, Busan, Korea, Mar. 13-16, 2016, pp. 1-3.

3GPP, "3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 V13.2.0 (Jun. 2016), pp. 1-623.

* cited by examiner

METHOD FOR RECEIVING MULTICAST DATA AND APPARATUS THEREOF

CROSS-REFERENCE TO RELATED APPLICATIONS

This application claims priority from Korean Patent Application Nos. 10-2016-0102624 and 10-2016-0102625 filed on Aug. 11, 2016, and 10-2016-0146056 and 10-2017-0071886, filed on Nov. 3, 2016 and Jun. 8, 2017, respectively, which are hereby incorporated by reference for all purposes as if fully set forth herein.

BACKGROUND OF THE INVENTION

Field of the Invention

The present disclosure relates to a method for receiving multicast data by an Internet of Thing (IoT) terminal requiring a low power and a low cost and an apparatus thereof. Further, the present disclosure relates to a processing method and a processing apparatus in accordance with change of multicast control information of a bandwidth reduced low complexity (BL) terminal, a coverage enhancement (CE) terminal, or a narrowband IoT (NB-IoT) terminal.

Description of the Related Art

The number of Internet of things (IoT) devices connected through a network is rapidly increased all over the world. In this situation, it is necessary to develop a technique for efficiently processing data transmission/reception of the IoT devices.

Specifically, a large number of IoT devices is installed in a wide area and requires stable network connection with low power consumption at a low cost. Further, the IoT devices may have a characteristic of intermittently transmitting and receiving a small amount of data. An long term evolution (LTE) or an LTE-advanced technique of the related art have been applied for IoT device communication. Such LTE and LTE advance might cause problems such as unnecessary power consumption and a cost of device are increased. Further, there are limitations in supporting communication for a large number of IoT devices with a limited number of licensed wireless resources.

In order to solve the problems, a narrow band IoT (NB IoT) technology and a BL or CE terminal technology based on the LTE network technology are introduced.

Specifically, the NB IoT performs communication using a narrow band to increase device acceptability and reduce power consumption and a cost. Further, the NB IoT provides a coverage increasing effect through a repeated transmission technology of data. Further, since demands for terminals operating in a broad coverage are increasing, it is necessary to develop a data processing method therefor.

In the meantime, an NB-IoT terminal, a BL terminal, or a CE terminal of the related art need to operate in a wide coverage with low power consumption so that only unicast data transmission/reception is supported. However, as multicast data transmission/reception of the terminals is demanded, it is also demanded of a technique for a specific method for processing multicast data of the NB-IoT terminal, the BL terminal, and the CE terminal.

SUMMARY OF THE INVENTION

In accordance with an aspect of the present disclosure, a multicast data processing method may be provided for a terminal operating in low power consumption, a narrow band, and a broad coverage, such as an NB-IoT terminal.

According to an aspect of the present disclosure, there is provided a method for receiving multicast data by a terminal. The method includes: starting a single cell-point to multipoint (SC-PTM) onduration timer (onDurationTimer) by a medium access control (MAC) entity of a terminal when discontinuous reception (DRX) is configured for a group-radio network temporary identifier (G-RNTI); monitoring a physical downlink control channel (PDCCH) during an active time; controlling at least one of the SC-PTM onduration timer and the SC-PTM inactivity timer (InactivityTimer) when the PDCCH includes information indicating downlink transmission; and repeatedly receiving the multicast data through a physical downlink shared channel (PDSCH) of one or more subframes.

According to another aspect of the present disclosure, there is provided a terminal which receives multicast data. The terminal includes: a control unit a control unit configured to i) start a single cell-point multipoint (SC-PTM) onduration timer through a medium access control (MAC) when discontinuous reception (DRX) is configured for group radio network temporary identifier (G-RNTI), ii) monitor a physical downlink control channel (PDCCH) during the active time, and iii) control at least one of the SC-PTM onduration timer and a SC-PTM inactivity timer when the PDCCH includes information indicating downlink transmission; and a receiving unit configured to repeatedly receive the multicast data through a physical downlink shared channel (PDSCH) of one or more subframes.

According to the above-described exemplary embodiment, an NB-IoT terminal, a BL terminal, and a CE terminal may efficiently process a multicast data traffic using a single-cell point-to-multipoint (SC-PTM) transmission method.

Further, the NB-IoT terminal, the BL terminal, and the CE terminal may receive multicast data to increase applicability and remove errors at the time of receiving multicast data.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
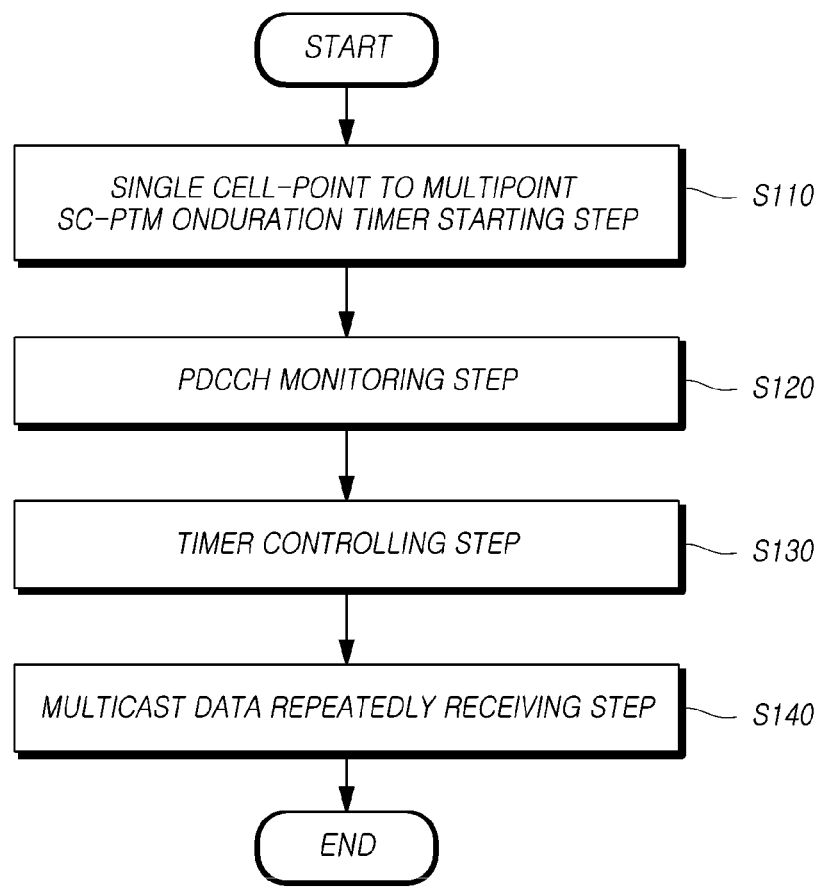
FIG. 1 is a flowchart explaining for an operation of a terminal according to an exemplary embodiment.

Hereinafter, some exemplary embodiments of the present disclosure will be described in detail with reference to the accompanying drawings. When reference numerals denote components in the drawings, even though the like components are illustrated in different drawings, it should be understood that like reference numerals refer to the same components. In addition, in the description of the present disclosure, the detailed descriptions of publicly known related constitutions or functions thereof may be omitted if they make the gist of the present disclosure unclear.

In this specification, a machine type communication (MTC) terminal may refer to a terminal which supports a low cost (or low complexity) or a terminal which supports a coverage enhancement. In this specification, an MTC terminal may refer to a terminal which supports a low cost (or low complexity) and coverage enhancement. Alternatively, in this specification, an MTC terminal may refer to a terminal which is defined as a specific category to support a low cost (or low complexity) and/or coverage enhancement.

In other words, in this specification, the MTC terminal may refer to 3GPP Release-13 low cost (or low complexity) UE category/type which performs an LTE based MTC related operation and is newly defined. Alternatively, in this specification, the MTC terminal may refer to an UE category/type defined in an existing 3GPP Release-12 or below which supports an enhanced coverage as compared with the existing LTE coverage or supports low power consumption or a newly defined Release-13 low cost (or low complexity) UE category/type.

The wireless communication system in the present disclosure is widely disposed to provide various communication services such as voice, packet data, and the like. The wireless communication system includes user equipment (UE) and a base station (BS or eNB). In this specification, the user terminal is a comprehensive concept which means a terminal in a wireless communication and needs to be interpreted as a concept which includes not only user equipment (UE) in a wideband code division multiple access (WCDMA), LTE, and high speed packet access (HSPA) but also a mobile station (MS), a user terminal (UT), a subscriber station (SS), and a wireless device in a GSM.

A base station or a cell generally refers to a station in which communication with a user terminal is performed and is also referred to as another terminology such as a node-B, evolved node-B (eNB), a sector, a site, a base transceiver system (BTS), an access point, a relay node, a remote radio head (RRH), a radio unit (RU), or a small cell.

That is, in this specification, the base station or the cell needs to be interpreted as a comprehensive meaning indicating a partial area or function covered by a base station controller (BSC) in the CDMA, a Node-B of WCDMA, or an eNB or a sector (site) in an LTE and is a meaning including all various coverage areas such as a megacell, a macrocell, a microcell, a picocell, a femtocell, a relay node, an RRH, an RU, and a small cell communication range.

In various cells listed above, there is a base station which controls each cell, so that the base station may be interpreted by two meanings. According to a first meaning, the base station may be a device itself which provides a megacell, a macrocell, a microcell, a picocell, a femtocell, or a small cell in relation to the wireless area or according to a second meaning, and the base station indicates the wireless area itself. According to the first meaning, when devices which provide a predetermined wireless area are controlled by the same entity or interact to configure the wireless area in cooperation with each other, all the device are indicated as a base station. Depending on a configuring method of a wireless area, eNB, RRH, an antenna, RU, LPN, a point, a transmission/reception point, a transmission point, and a reception point may be examples of the base station. According to the second meaning, the wireless area in which a signal is transmitted or received by a user terminal or a neighboring base station may be indicated as a base station.

Therefore, the megacell, the macrocell, the microcell, the picocell, the femtocell, the small cell, the RRH, the antenna, the RU, the low power node (LPN), the point, the eNB, the transmission/reception point, the transmission point, and the reception point are collectively referred to as a base station.

In this specification, the user terminal and the base station are used as a comprehensive meaning as two transmission and reception subjects used to implement a technique or a technical spirit described in this specification, but is not limited by a term or a word which is specifically referred to. The user terminal and the base station are used as a comprehensive meaning including two (uplink or downlink) transmission and reception subjects used to implement a technique or a technical spirit described in this specification, but is not limited by a term or a word which is specifically referred to. Here, the uplink (UL) means a method for transmitting and receiving data to the base station by a user terminal and the downlink (DL) means a method for transmitting and receiving data to the user terminal by the base station.

There is no limitation on a multiple access technique which is applied to a wireless communication system. Various multiple access techniques may be used, such as code division multiple access (CDMA), time division multiple access (TDMA), frequency division multiple access (FDMA), orthogonal frequency division multiple access (OFDMA), OFDM-FDMA, OFDM-TDMA, and OFDM-CDMA. An exemplary embodiment of the present disclosure may be applied to resource allocation such as asynchronous wireless communication which evolves into LTE and LTE-advanced through GSM, WCDMA, and HSPA and synchronous wireless communication which evolves into CDMA, CDMA-2000, and UMB. The present disclosure should not be interpreted to be restricted or limited to a specific wireless communication field and should be interpreted to include all technical fields to which a spirit of the present disclosure is applicable.

Herein, a time division duplex (TDD) technique performs transmission by different times, and a frequency division duplex (FDD) technique performs transmission by using different frequencies. Such a TDD technique or the FDD technique may be used for uplink transmission and downlink transmission.

Further, in a system such as LTE or LTE-advanced, the uplink and the downlink are configured with respect to one carrier wave or carrier wave pair to configure a specification. The uplink and the downlink transmit control information through a control channel such as a physical downlink control channel (PDCCH), a physical control format indicator channel (PCFICH), a physical hybrid ARQ indicator channel (PHICH), a physical uplink control channel (PUCCH), or an enhanced physical downlink control channel (EPDCCH) and are configured by a data channel such as a physical downlink shared channel (PDSCH) or a physical uplink shared channel (PUSCH) to transmit data.

In the meantime, the control information may be transmitted also using enhanced PDCCH or extended PDCCH (EPDCCH).

In this specification, the cell may refer to a component carrier which has a coverage of a signal transmitted from a transmission point or a coverage of a signal transmitted from a transmission/reception point, or a transmission/reception point itself.

The wireless communication system to which the exemplary embodiments are applied may be a coordinated multi-point transmission/reception system (CoMP system), a coordinated multi-antenna transmission system, or a coordinated multi-cell communication system in which two or more transmission/reception points cooperate to transmit a signal.

The CoMP system may include at least two multiple transmission/reception points and terminals.

The multi transmission/reception point may be a base station or a macro cell (hereinafter, referred to as an 'eNB) and at least one RRH which is connected to the eNB by an optical cable or an optical fiber to be wirely controlled and has a high transmission power or low transmission power in the macro cell area.

Hereinafter, the downlink refers to communication or a communication channel from the multiple transmission/reception point to the terminal and the uplink refers to communication or a communication channel from the terminal to the multiple transmission/reception point. A transmitter in the downlink may be a part of the multiple transmission/reception point and a receiver may be a part of the terminal. A transmitter in the uplink may be a part of the terminal and a receiver may be a part of multiple transmission/reception point.

Hereinafter, a situation in which a signal is transmitted or received through a channel such as PUCCH, PUSCH, PDCCH, EPDCCH, and PDSCH may be described that PUCCH, PUSCH, PDCCH, EPDCCH, and PDSCH are transmitted or received.

Further, hereinafter, a description that PDCCH is transmitted or received or a signal is transmitted or received through PDCCH may also mean that EPDCCH is transmitted or received or a signal is transmitted or received through EPDCCH.

That is, a physical downlink control channel which will be described below may refer to PDCCH or EPDCCH or may be used as a meaning including both PDCCH and EPDCCH.

Further, for the convenience of description, EPDCCH which is an exemplary embodiment of the present disclosure may be applied to a portion described as PDCCH and EPDCCH may also be applied to a portion described as EPDCCH, as an exemplary embodiment of the present disclosure.

In the meantime, high layer signaling which will be described below includes RRC signaling which transmits RRC information including an RRC parameter.

eNB performs downlink transmission to the terminals. eNB may transmit a physical downlink shared channel (PDSCH) which is a main physical channel for unicast transmission and a physical downlink control channel (PDCCH) for transmitting downlink control information such as scheduling required to receive PDSCH and scheduling approval information for transmission in an uplink data channel (for example, a physical uplink shared channel (PUSCH)). Hereinafter, when the signal is transmitted/received through each channel, it is described that the corresponding channel is transmitted or received.

In 3GPP Release-12 and Release-13 documents, a BL (a bandwidth reduced low complexity) terminal and a CE (coverage enhancement) terminal technologies are standardized. A low complexity (LC) terminal represents a terminal which is targeted for low-end application with a low profit, a low rate, and low latency sensitivity such as some MTC terminals. The LC terminal has Tx and Rx capabilities which are reduced as compared with terminals in other category. The BL terminal operates in an arbitrary LTE system band having a restricted channel band width of six PRBs which correspond to a maximum channel bandwidth available in 1.4 MHz LTE system. The CE terminal requires an enhanced coverage function to be connected to a cell.

In the meantime, a narrowband internet of things (NB-IoT) technology is standardized in 3GPP Release-13. The purpose is to specify wireless access for cellular IoT. 3GPP Release-13 includes enhanced indoor coverage, support for a large-scale low rate terminal, low latency sensitivity, a low price terminal cost, low power consumption, and an optimized network structure.

The above-described BL terminal or CE terminal or NB-IoT terminal are provided to have functions for allowing a 3GPP system to rapidly penetrate into a low cost-IoT market. Therefore, some functions provided to a normal LTE terminal which provides a mobile broadband service are not provided. For example, multicast transmission (or MBMS service or SC-PTM transmission, For the convenience of description, this will be described based on SC-PTM, but MBSFN transmission is also included in the scope of the present disclosure) which is provided for a normal terminal is not provided for the Rel-13 BL terminal, the CE terminal, or the NB-IoT terminal.

In the LTE, MBMS transmission uses one of MBSFN transmission and SC-PTM transmission. Multi-cell/multicast coordination entity (MCE) determines which one of SC-PTM and MBSFN is used for each MBMS session. In the SC-PTM, MBMS is transmitted in single cell coverage. In the SC-PTM, SC-MCCH which is one control channel and SC-MTCH(s) which is one or more traffic channels are provided. The SC-MCCH which is one control channel and the SC-MTCH(s) which is one or more traffic channels are mapped on a DL-SCH.

Scheduling is provided by a base station. Following scheduling information for each SC-MTCH is provided on SC-MCCH:

SC-MTCH scheduling cycle

SC-MTCH on-duration: Duration in downlink subframes that the UE waits for, after waking up from DRX, to receive PDCCHs. When the UE successfully decodes one PDCCH which indicates the DL-SCH, the UE stays awake and starts an inactivity timer.

SC-MTCH inactivity timer: When duration in downlink subframes that the UE waits to successfully decode a PDCCH from the last successful decoding of one PDCCH indicating the DL-SCH fails, the UE re-enters the DRX. The UE needs to restart the inactivity timer following one single successful decoding of one PDCCH.

As described above, according to the related art, the SC-PTM transmission data is received through scheduling for one PDCCH. Therefore, it is difficult for the BL terminal, the CE terminal, or the NB-IoT terminal which requires to receive data through repetition transmission to efficiently receive the MBMS traffic data through the SC-PTM.

In order to solve the above-mentioned problem, an object of the exemplary embodiment is to provide a method and an apparatus for providing multicast transmission which is provided for a normal terminal to a BL terminal, a CE terminal, or an NB-IoT terminal. Specifically, an object of the exemplary embodiment is to provide a method and an apparatus for efficiently receiving a multicast traffic channel through a SC-PTM transmission method.

In the related art, for a bandwidth-reduced operation, MTC physical downlink control channel/physical downlink control channel for BL UEs or UEs in an enhanced coverage (MPDCCH) is used to transport common signaling and terminal specified signaling. MPDCCH supports RA-RNTI, SI-RNTI, P-RNTI, C-RNTI, temporary C-RNTI, and SPS C-RNTI.

In the related art, a narrowband physical downlink control channel (NPDCCH) is located in an available symbol of the configured subframe with respect to the NB-IoT. The NPD-CCH supports C-RNTI, Temporary C-RNTI, P-RNTI, and RA-RNTI.

In the related art, a downlink scheduling technology is applied to the NB-IoT, as follows.

Scheduling information for the downlink data is transmitted on a downlink physical control channel NPDCCH. The scheduled downlink data is transmitted on a shared data channel NPDSCH.

Only cross-subframe scheduling is provided. Cross-carrier scheduling is not supported. The transmission duration in the number of sub-frames for the NPDCCH and the NPDSCH is variable.

The transmission duration in the number of sub-frames is semi-static for the NPDCCH and is indicated for the NPDSCH as a part of the scheduling information transmitted on the NPDCCH.

The start time of the NPDSCH relative to the NPDCCH is signaled as a part of the scheduling message.

A discontinuous receiving operation for the SC-PTM with respect to the LTE terminal is as follows.

When DRX is configured for a G-RNTI, the Active Time includes the time while: SC-MTCH onduration (onDurationTimerSCPTM) or an SC-MTCH inactivity timer (drx-InactivityTimerSCPTM) is running.

When DRX is configured for a G-RNTI, the MAC entity, for each subframe for this G-RNTI, if [(SFN*10)+subframe number] modulo (SC-MTCH-SchedulingCycle)=S C-MTCH-SchedulingOffset, starts SC-MTCH onduration (onDurationTimerSCPTM).

During the active time, for a PDCCH-subframe, the MC entity monitors the PDCCH.

If the PDCCH indicates a DL transmission, the MAC entity starts or restarts SC-MTCH inactivity timer (drx-InactivityTimerSCPTM).

Hereinafter, a multicast data receiving method of a BL terminal, a CE terminal, or an NB-IoT terminal will be described in detail. Further, in this specification, for the convenience of description, the BL terminal, the CE terminal, or the NB-IoT terminal is denoted as a terminal and an LTE terminal of the related art to which a technology for a low power consumption and a low cost is not applied is denoted as a normal terminal or an LTE terminal to distinguish the terminals.

In addition, a downlink control channel (PDCCH) which will be described below collectively includes terminologies which vary in accordance with the terminal and is interpreted to collectively include a MPDCCH and a NPDCCH. Similarly, a downlink data channel (PDSCH) collectively includes terminologies which vary in accordance with the terminal and is interpreted to collectively include a MPDSCH and a NPDSCH.

That is, terminologies for a channel and data such as a downlink control channel and a downlink data channel which will be described below may be variously named according to a category of the terminal (for example, the BL terminal, the CE terminal, or the NB-IoT terminal) and is used as a meaning including all terminologies differently named according to the category of each terminal.

Further, an exemplary of the NB-IoT terminal will be mainly described below. However, this is for convenience of description and the BL terminal or the CE terminal is also included in the scope of the present disclosure.

FIG. 1 is a flowchart explaining for an operation of a terminal according to an exemplary embodiment.

Referring to FIG. 1, when a discontinuous reception (DRX) is configured for a group-radio network temporary identifier (G-RNTI), a medium access control (MAC) entity of the terminal may start a single cell-point to multipoint (SC-PTM) onduration timer (onDurationTimer) (S110). For example, when DRX is configured for the G-RNTI, the terminal may start the SC-PTM onduration timer to start an active time. The G-RNTI is an identifier for receiving the SC-MTCH. When the DRX is configured for the G-RNTI, the MAC entity of the terminal may start the SC-PTM onduration timer to receive the SC-MTCH. For example, when [(SFN*10)+subframe number] modulo (SC-MTCH-SchedulingCycle)=SC-MTCH-SchedulingOffset, the terminal may start SC-MTCH onduration (onDurationtimerscptm). H-SFN may be provided to the BL terminal or the CE terminal in the system information SystemInformationBlockType1-BR. H-SFN may be always provided to the NB-IoT. Therefore, when H-SFN (hyper system frame number) is provided, if [(H-SFN*10240+SFN*10)+subframe number] modulo (SC-MTCH-SchedulingCycle)=SC-MTCH-SchedulingOffset, the terminal may start SC-MTCH onduration (onDurationTimerSCPTM). The same may be applied to the following exemplary embodiment.

Figure 2:
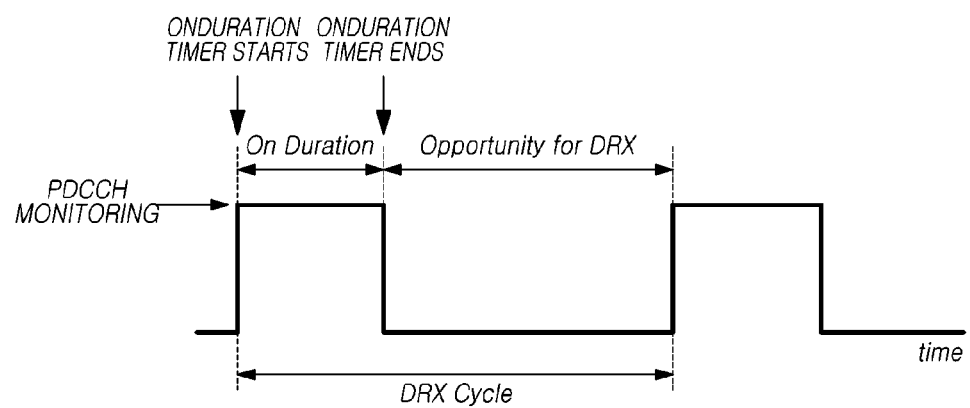
FIG. 2 is a view explaining for an active time according to an exemplary embodiment.

The terminal may perform monitoring physical downlink control channel (PDCCH) during an active time (S120). As illustrated in FIG. 2, the terminal may monitor the downlink control channel at an active time while an onduration timer is running. The active time refers to a duration while a SC-PTM onduration timer or an SC-PTM inactivity timer is running.

When the PDCCH includes information indicating downlink transmission, the terminal may perform a timer control step of controlling at least one of the SC-PTM onduration timer and the SC-PTM inactivity timer InactivityTimer (S130). When the terminal identifies that information indicating downlink transmission is included in the PDCCH while monitoring the PDCCH during the active time, the terminal may control at least one of the SC-PTM onduration timer and the SC-PTM inactivity timer to be changed.

For example, when information indicating downlink transmission is included in the PDCCH, the terminal may stop the SC-PTM onduration timer and the SC-PTM inactivity timer. That is, when information indicating downlink transmission is detected as a result of monitoring the PDCCH, the terminal may stop the started SC-PTM onduration timer and SC-PTM inactivity timer.

For another example, when information indicating downlink transmission is included in the PDCCH, the terminal may start or restart the SC-PTM inactivity timer. In this case, the starting or restarting of the SC-PTM inactivity timer may be performed in a last subframe in which multicast data is repeatedly received. That is, the terminal may control the SC-PTM inactivity timer to be started or restarted in the last subframe in which the multicast data is repeatedly received.

For another example, a timer control operation may be divided according to a type of the terminal, a category of the terminal or a capability of the terminal. For example, when the terminal is allowed to access a network service in which a channel bandwidth is restricted to be 200 kHz or lower (for example, a terminal is set to receive DCI through an NPDCCH), if information indicating downlink transmission is included in the PDCCH, the terminal may stop the SC-PTM onduration timer and the SC-PTM inactivity timer. When the terminal is set to operate at a bandwidth restricted to six physical resource blocks (PRB) (for example, a terminal set to receive a DCI through the MPDCCH), if the information indicating downlink transmission is included in the PDCCH, the terminal may start or restart the SC-PTM inactivity timer. A starting or restarting timing may be performed in the last subframe in which the multicast data is repeatedly received. That is, when the information indicating downlink transmission is included in the PDCCH, the NB-IoT terminal stop the SC-PTM onduration timer and the SC-PTM inactivity timer. Further, when the information indicating downlink transmission is included in the PDCCH, the BL or CE terminal start or restart the SC-PTM inactivity timer.

The terminal may repeatedly receive multicast data through a physical downlink shared channel (PDSCH) of one or more subframes (S140). For example, the terminal receives the SC-MTCH through a downlink data channel to receive multicast data. Since a terminal receiving the multicast data is a terminal requested to have enhanced coverage, low cost, or low power consumption operation as described above, the multicast data may be repeatedly received through a plurality of subframes.

As described above, the terminal may normally receive the multicast data through the above-described operation.

Further, the terminal may receive the SC-PTM onduration timer and the SC-PTM inactivity timer through a corresponding PDSCH by decoding the PDCCH indicated according to single cell-multicast control channel SC-MCCH scheduling information. Further, the SC-MCCH scheduling information may be received through system information.

Here, the PDCCH indicated according to the SC-MCCH scheduling information may include change notification information for change notification of multicast control information. For example, the change notification information may be decoded through a single cell-radio network temporary identifier (SC-RNTI). For another example, the change notification information is configured by one bit to be received by the terminal.

The terminal may check whether multicast control information is changed through a PDCCH indicated through the system information and may receive the changed SC-PTM onduration timer and SC-PTM inactivity timer.

Hereinafter, various exemplary embodiments of the above-described timer control operation of the terminal will be additionally described. Hereinafter, the NB-IoT terminal will be mainly described, but the exemplary embodiment may also be applied to the BL or CE terminal as described above. When the following description is applied to the BL or CE terminal, NPDCCH is changed to MPDCCH and NPDSCH is changed to MPDSCH.

Method for Adding and Controlling a Transmission Timer for SC-MTCH Reception

The NB-IoT terminal needs to wait for the last subframe of a NPDCCH search space configured before performing a subsequent operation. The NB-IoT terminal is provided only with cross-subframe scheduling, and a PDSCH start time relative to the PDCCH is signaled as a part of scheduling message/scheduling information/DCI. For example, the terminal detects NPDCCH with an NB-IoT DCI format N1 and N2 ending in the subframe n for the terminal, starts in a n+5 downlink subframe, and decodes the corresponding NPDSCH of N consecutive NB-IoT downlink subframe ki. The subframe n is the last subframe in which the NPDCCH is transmitted and is determined by the starting subframe of NPDCCH transmission and the DCI subframe repetition number and the subframe ki is a N consecutive NB-IoT downlink subframe excluding a subframe used for an SI message. (where, $0 \le k0 \le k1 < \ldots, kN-1, N=N_{Rep}N_{SF}$, where the value of $N_{Rep}$ is determined by the repetition number field in the corresponding DCI, and the value of $N_{SF}$ is determined by the resource assignment field in the corresponding DCI, and the value of k0 is determined by the scheduling delay field ($I_{Delay}$) for DCI format N1 according to Table 16.4.1-1, and $k_0=5$ for DCI format N2. The value of $R_{max}$ is according to subclause 16.6 for the corresponding DCI format N1.)

The NB-IoT terminal may not support a plurality of reception processes to receive SC-PTM.

Therefore, when the downlink transmission to the SC-MTCH is indicated to the PDCCH, the NB-IoT terminal (or an MAC entity of the NB-IoT terminal) does not need to try to monitor the PDCCH until the downlink transmission ends. For example, the NB-IoT terminal does not need to try to monitor from a subframe (TTI) which successfully decodes the downlink transmission on the PDCCH to a subframe including last reception of the corresponding PDSCH reception. For another example, the NB-IoT terminal does not need to try to monitor from a subframe which receives the downlink transmission on the PDCCH to a subframe including the last reception of the corresponding PDSCH reception. As still another example, the NB-IoT terminal does not need to try to monitor from a last PDCCH subframe which indicates the downlink transmission on the PDCCH to a subframe including the last reception of the corresponding PDSCH reception.

When the downlink transmission ends, the NB-IoT terminal (or MAC entity of the NB-IoT terminal) may try or retry to monitor the PDCCH. To this end, a SC-MTCH transmission timer for the NB-IoT terminal may be defined as follows to be used.

EXAMPLES

When DRX is configured for G-RNTI, an active time includes a time while a SC-MTCH onduration (onDurationTimer SCPTM) or SC-MTCH inactivity timer (drx-InactivityTimerSCPTM) is running.

For example, when [(SFN*10)+subframe number] modulo (SC-MTCH-SchedulingCycle)=SC-MTCH-SchedulingOffset for each subframe for the G-RNTI, the MAC entity may start SC-MTCH onduration (onDurationTimerSCPTM).

The MAC entity monitors PDCCH for the PDCCH subframe during the active time.

When the PDCCH indicates one downlink transmission, if the terminal is an NB-IoT terminal (or when the PDCCH instructs the NB-IoT terminal one downlink transmission), the NB-IoT terminal starts the SC-MTCH transmission timer.

When the SC-MTCH transmission timer ends in this subframe with respect to the NB-IoT terminal, the NB-IoT terminal starts or restarts the SC-MTCH inactivity timer (drx-InactivityTimerSCPTM).

When the PDCCH indicates one downlink transmission, if the terminal is an NB-IoT terminal (or when the PDCCH indicates one downlink transmission to the NB-IoT terminal), the NB-IoT terminal stops the SC-MTCH inactivity timer (drx-InactivityTimerSCPTM).

The NB-IoT terminal stops SC-MTCH onduration (onDurationTimerSCPTM).

For example, the above-described SC-MTCH transmission timer is a static value and is indicated by a base station. This may be indicated on system information or SC-MCCH. As another, the above-described SC-MTCH transmission timer is a semi-static value and is indicated by the base station. This may be indicated on the SC-MCCH. As still another example, the SC-MTCH transmission timer may be dynamically indicated by a value by a part of scheduling information which is transmitted onto a linked NPDCCH by indicating transmission duration (or a value obtained by adding a subframe for the NPDSCH to a last PDCCH subframe number) in the number of subframes for the NPDSCH.

EXAMPLES

When DRX is configured for G-RNTI, an active time includes a time while a SC-MTCH onduration (onDurationTimerSCPTM), SC-MTCH inactivity timer (drx-InactivityTimerSCPTM), or a SC-MTCH transmission timer (transmissionTimerSCPTM is running).

When [(SFN*10)+subframe number] modulo (SC-MTCH-SchedulingCycle)=SC-MTCH-SchedulingOffset for each subframe for the G-RNTI, the MAC entity may start the SC-MTCH onduration (onDurationTimerSCPTM).

The MAC entity monitors PDCCH for the PDCCH subframe during the active time.

When the PDCCH instructs one downlink transmission, if the terminal is the NB-IoT terminal (or when the PDCCH instructs the NB-IoT terminal one downlink transmission), the SC-MTCH transmission timer starts in a subframe containing the last reception of the corresponding PDSCH repeatedly reception.

When the SC-MTCH transmission timer ends in this subframe, (if the terminal is the NB-IoT terminal), the terminal starts or restarts the SC-MTCH inactivity timer (drx-InactivityTimerSCPTM).

If the PDCCH indicates the NB-IoT terminal downlink transmission, the terminal stops the SC-MTCH inactivity timer (drx-InactivityTimerSCPTM).

For example, the above-described SC-MTCH transmission timer is a static value and is indicated by a base station. This may be indicated on system information or SC-MCCH. For another example, the SC-MTCH transmission timer is a semi-static value and is indicated by the base station. This may be indicated on the SC-MCCH. For another example, the above-described SC-MTCH transmission timer may be dynamically indicated by a value by a part of scheduling information which is transmitted onto a linked NPDCCH by indicating transmission duration in the subframe number for the NPDSCH.

Start drx-InactivityTimerSCPTM Timer After Subframe Including PDSCH Last Reception The NB-IoT terminal needs to wait for the last subframe of a NPDCCH search space configured before performing a subsequent operation. The NB-IoT is provided only with cross-subframe scheduling, and a PDSCH start time relative to the PDCCH is signaled as a part of scheduling message/ scheduling information/DCI. For example, the terminal detects NPDCCH with an NB-IoT DCI format N1 and N2 ending in the subframe n for the terminal, starts in n+5 downlink subframe, and decodes the corresponding NPDSCH of N consecutive NB-IoT downlink subframe ki. The subframe n is the last subframe in which the NPDCCH is transmitted and is determined by the starting subframe of NPDCCH transmission and the DCI subframe repetition number and the subframe ki is a N consecutive NB-IoT downlink subframe excluding a subframe used for an SI message.

(where, $0<k0<k1 \ldots, kN-1, N=N_{Rep}N_{SF}$, where the value of $N_{Rep}$ is determined by the repetition number field in the corresponding DCI, and the value of $N_{SF}$ is determined by the resource assignment field in the corresponding DCI, and the value of k0 is determined by the scheduling delay field ($I_{Delay}$) for DCI format N1 according to Table 16.4.1-1, and $k_0=5$ for DCI format N2. The value of $R_{max}$ is according to subclause 16.6 for the corresponding DCI format N1.)

The NB-IoT terminal may not support a plurality of reception processes (for SC-PTM reception).

Therefore, when the downlink transmission to the SC-MTCH is indicated to the PDCCH, the NB-IoT terminal (or an MAC entity of the NB-IoT terminal) does not need to try to monitor the PDCCH until the downlink transmission ends. For example, the NB-IoT terminal does not need to try to monitor from a subframe (TTI) which successfully decodes the downlink transmission on the PDCCH to a subframe including last reception of the corresponding PDSCH reception. For another example, the NB-IoT terminal does not need to try to monitor from a subframe which receives the downlink transmission on the PDCCH to a subframe including last reception of the corresponding PDSCH reception. As still another example, the NB-IoT terminal does not need to try to monitor from a last PDCCH subframe which indicates the downlink transmission on the PDCCH to a subframe including last reception of the corresponding PDSCH reception.

When the downlink transmission ends, the NB-IoT terminal (or MAC entity of the NB-IoT terminal) may try (retry) to monitor the PDCCH. The NB-IoT terminal may try (or retry) to monitor PDCCH in subsequent PDCCH occasion after a subframe including last reception of the corresponding PDSCH reception.

An example for this is as follows.

When DRX is configured for G-RNTI, an active time includes a time while a SC-MTCH onduration (onDurationTimerSCPTM) or SC-MTCH inactivity timer (drx-InactivityTimerSCPTM) is running.

When [(SFN*10)+subframe number] modulo (SC-MTCH-SchedulingCycle)=SC-MTCH-SchedulingOffset for each subframe for the G-RNTI, the MAC entity may start SC-MTCH onduration (onDurationTimerSCPTM).

The MAC entity monitors PDCCH for the PDCCH subframe during the active time.

When the PDCCH indicates one downlink transmission, if the terminal is the NB-IoT terminal (or when the PDCCH indicates one downlink transmission to the NB-IoT terminal), the NB-IoT terminal starts or restarts the SC-MTCH inactivity timer (drx-InactivityTimerSCPTM) in a subframe containing the last reception of the corresponding PDSCH reception.

Further, the NB-IoT terminal starts or restarts the SC-MTCH inactivity timer (drx-InactivityTimerSCPTM) in a subframe subsequent to the subframe containing the last reception of the corresponding PDSCH reception.

Alternatively, the NB-IoT terminal starts or restarts the SC-MTCH inactivity timer (drx-InactivityTimerSCPTM) in the first subframe in a subsequent PDCCH occasion after the subframe containing the last reception of the corresponding PDSCH reception.

When the PDCCH indicates one downlink transmission, if the terminal is an NB-IoT terminal (or when the PDCCH indicates one downlink transmission to the NB-IoT terminal), the NB-IoT terminal stops the SC-MTCH inactivity timer (drx-InactivityTimerSCPTM).

The NB-IoT terminal stops SC-MTCH onduration (onDurationTimerSCPTM).

Method which Does Not Use or Apply drx-InactivityTimerSCPTM for SC-MTCH Reception Non-consecutive reception for SC-PTM may allow the NB-IoT terminal to receive SC-MTCH data without using/ applying SC-MTCH inactivity timer (drx-InactivityTimerSCPTM).

The NB-IoT terminal needs to wait for the last subframe of a NPDCCH search space configured before performing a subsequent operation. The NB-IoT is provided only with cross-subframe scheduling and the NB-IoT terminal has one DL HARQ process in addition to a broadcast HARQ process. Therefore, non-consecutive reception may be performed without using drx-InactivityTimerSCPTM instead of operating drx-InactivityTimerSCPTM by complicatedly waiting for NPDSCH transmission.

An example for this is as follows.

When DRX is configured for the G-RNTI with respect to the NB-IoT terminal, the active time includes a time while SC-MTCH onduration (onDurationTimerSCPTM) is running.

When [(SFN*10)+subframe number] modulo (SC-MTCH-SchedulingCycle)=SC-MTCH-SchedulingOffset for each subframe for the G-RNTI, the MAC entity may start SC-MTCH onduration (onDurationTimerSCPTM).

The MAC entity monitors PDCCH for the PDCCH subframe during the active time.

If the PDCCH instructs the NB-IoT terminal downlink transmission, the NB-IoT terminal stops the SC-MTCH onduration (onDurationTimerSCPTM).

Method for Setting SC-MTCH Inactivity Timer to be Zero

Non-consecutive reception for SC-PTM may allow the NB-IoT terminal to receive SC-MTCH data without using SC-MTCH inactivity timer (drx-InactivityTimerSCPTM). As an example therefor, for the SC-PTM with respect to the NB-IoT terminal, the SC-MTCH inactivity timer (drx-InactivityTimerSCPTM) may be set to be zero.

The NB-IoT terminal needs to wait for the last subframe of a NPDCCH search space configured before performing a subsequent operation. The NB-IoT is provided only with cross-subframe scheduling and the NB-IoT terminal has one DL HARQ process in addition to a broadcast HARQ process. Therefore, non-consecutive reception may be performed by setting drx-InactivityTimerSCPTM to be zero instead of operating drx-InactivityTimerSCPTM by complicatedly waiting for NPDSCH transmission.

An example for this is as follows.

When DRX is configured for G-RNTI, an active time includes a time while SC-MTCH onduration (onDurationTimerSCPTM), SC-MTCH inactivity timer (drx-InactivityTimerSCPTM), or SC-MTCH transmission timer transmissionTimerSCPTM is running.

When [(SFN*10)+subframe number] modulo (SC-MTCH-SchedulingCycle)=SC-MTCH-SchedulingOffset for each subframe for the G-RNTI, the MAC entity may start SC-MTCH onduration (onDurationTimerSCPTM).

The MAC entity monitors PDCCH for the PDCCH subframe during the active time.

If the PDCCH instructs the NB-IoT terminal downlink transmission, the NB-IoT terminal stops the SC-MTCH onduration (onDurationTimerSCPTM).

Method for Stopping on Duration Timer when SC-MTCH Downlink Transmission is Indicated When the NB-IoT successfully decodes NPDCCH, the NB-IoT receives the NPDSCH in the subsequent subframe using scheduling information on the NPDCCH. The reception is tried in the NPDSCH according to the scheduling information on scheduling on the NPDCCH so that there is no need to decode the NPDCCH while receiving in the NPDSCH. Therefore, in the subframe in which downlink reception for the NPDSCH is requested to the NB-IoT, the NPDCCH may not be monitored. That is, the subframe may monitor the NPDCCH for a subframe in which the downlink reception is not requested on the NPDSCH.

Therefore, if the PDCCH instructs the NB-IoT terminal downlink transmission, the NB-IoT terminal stops the SC-MTCH onduration (onDurationTimerSCPTM).

The BL terminal or the CE terminal may have a plurality of HARQ processes (or a plurality of reception processes). However, when the SC-MTCH is provided to the BL terminal or the CE terminal, this may be provided by a broadcast HARQ process. Alternatively, when the SC-MTCH is provided to the BL terminal or the CE terminal, this may be provided without using a HARQ process. Alternatively, when the SC-MTCH is provided to the BL terminal or the CE terminal, this may be provided by a single reception process without using a HARQ process. In this case, when the BL terminal or the CE terminal tries to receive in the MPDSCH according to the scheduling information on the scheduling on the MPDCCH, there is no need to decode the MPDCCH while receiving in the MPDSCH. Therefore, in the subframe in which downlink reception for the MPDSCH is requested to the BL terminal or the CE terminal, the MPDCCH may not be monitored.

If the PDCCH indicates the BL terminal or the CE terminal the downlink transmission, the BL terminal or the CE terminal starts or restarts SC-MTCH inactivity timer (drx-InactivityTimerSCPTM) in a subframe containing the last reception of the corresponding PDSCH reception.

Further, the BL terminal or the CE terminal stops the SC-MTCH onduration (onDurationTimerSCPTM).

Method for Using a Plurality of Processors for SC-MTCH Reception

The BL terminal or the CE terminal may have a plurality of DL HARQ processes.

Figure 3:
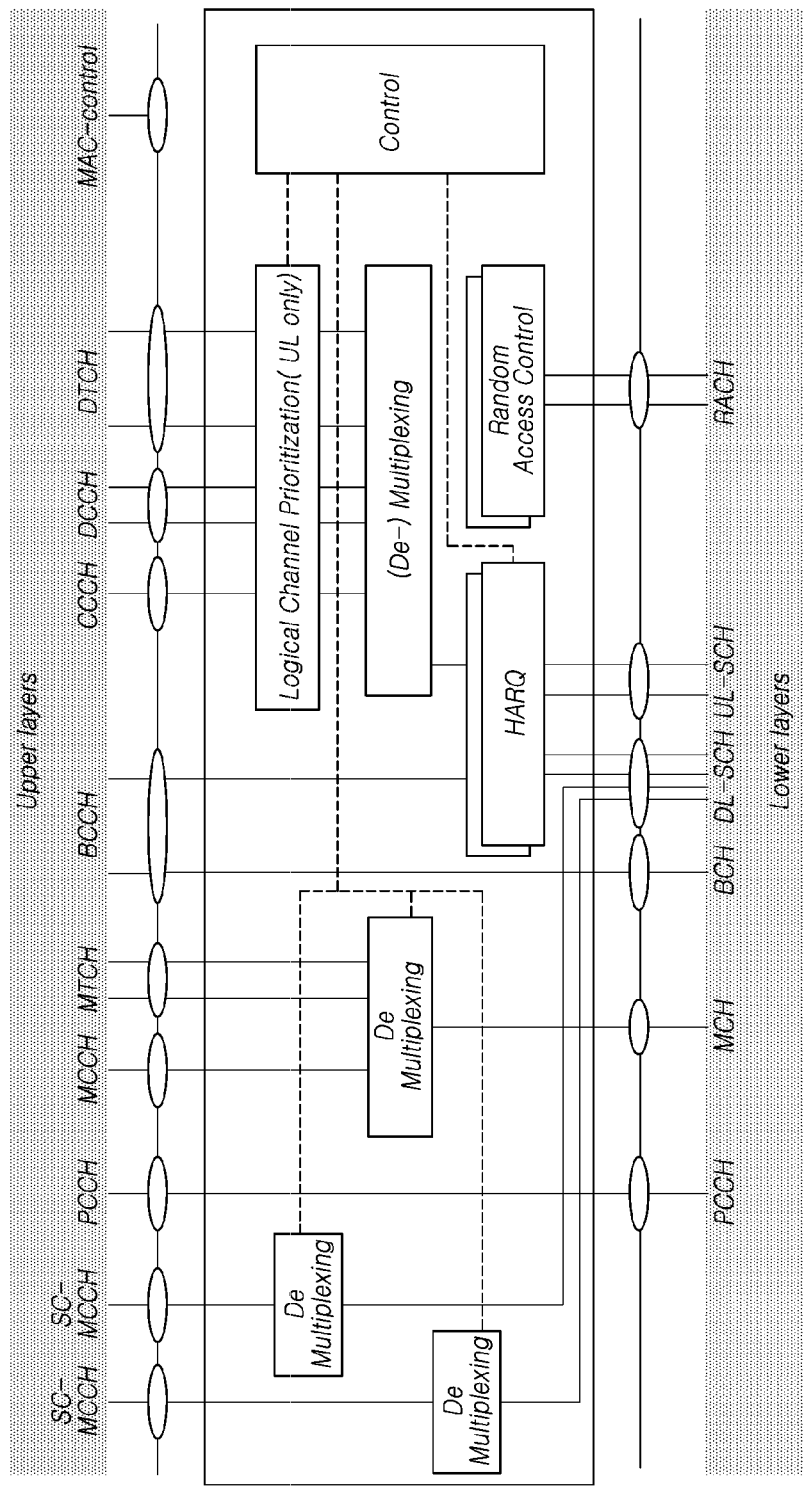
FIG. 3 is a view illustrating an MAC entity structure according to an exemplary embodiment.

The NB-IoT terminal may have one DL HARQ process in addition to the broadcast HARQ process. As an example, the terminal may perform the broadcast HARQ process for SC-MTCH reception. FIG. 3 illustrates an MAC entity structure according to an exemplary embodiment. As illustrated in FIG. 3, SC-MTCH data applied to a normal LTE terminal of the related art does not use the HARQ process. The SC-MTCH data applied to the normal LTE terminal of the related art is received through the DL-SCH and is directly transmitted to an upper layer through demultiplexing. When the broadcast HARQ process is used for SC-MTCH reception, an MAC entity (or terminal) operates as follows.

When downlink control information (downlink scheduling) is received in this TTI on the PDCCH with respect to the G-RNTI, one or more information among downlink control information (one or more of resource allocation information, MSC, a repetition number, and a DCI subframe repetition number) and a redundancy version is indicated to the broadcast HARQ process. When the data is successfully decoded, the decoded MAC PDU is transmitted to an upper layer.

For another example, the terminal may not use the HARQ process for SC-MTCH reception.

When the terminal does not use the HARQ process, but uses a plurality of processes, if the downlink transmission is instructed on all processes, the terminal may stop the SC-MTCH onduration (onDurationTimerSCPTM). For example, when two processes are used, if PDCCH indicates downlink transmission in one process to perform downlink reception while PDCCH indicates downlink transmission in the other process, the terminal stops the ST-MTCH onduration (onDurationTimerSCPTM).

As described above, according to the present exemplary embodiment, a multicast traffic channel may be effectively transmitted to the BL terminal, the CE terminal, or the NB-IoT terminal through a SC-PTM transmission method. Further, the terminal may receive not only unicast data but also multicast data by controlling a timer without incurring an error.

In the meantime, when the terminal receives the multicast data, the SC-MCCH may be changed. The SC-MCCH includes multicast control information required to receive multicast data and may be changed if necessary.

However, when the multicast control information is changed, a method for processing the change of the multicast control information is not set in the BL or CE terminal and the NB-IoT terminal. Therefore, a process for receiving change notification of the multicast control information is required to receive the multicast data without incurring an error.

Hereinafter, various exemplary embodiments of a terminal for processing notification of change of the multicast control information received through the SC-MCCH will be mainly described.

As described, the terminal may identify SC-MCCH transmission on the PDCCH using SC-RNTI. Here, the SC-MCCH indicates a control channel or multicast control information for transmitting control information linked to MBMS transmission using the SC-PTM. The SC-MCCH uses a modification period. A notification mechanism is used to announce change of the SC-MCCH due to session start. The notification is sent into a first subframe within a repetition period at which the SC-MCCH is scheduled. The notification is sent using the DCI format 1C with single cell notification RNTI (SC-N-RNTI) and one bit within 8-bit bitmap. When the terminal receives the notification, the terminal obtains SC-MCCH in the same subframe. The terminal detects change of the SC-MCCH which is not announced by the notification mechanism through the SC-MCCH monitoring at the modification period.

In order to receive data using the SC-PTM, the BL terminal, the CE terminal, or the NB-IoT terminal receives change of the SC-MCCH due to the session start to obtain the SC-MCCH and recognizes related SC-MTCH traffic channel information. When the SC-MCCH is changed, the terminal needs to detect the change. However, the BL terminal, the CE terminal, or the NB-IoT terminal which receives the data through repetition does not detect the change of the SC-MCCH or does not obtain the SC-MCCH using the related art method. For example, the NB-IoT terminal is provided only with cross-subframe scheduling. Therefore, the NB-IoT terminal may not receive the SC-MCCH notification which is sent in the first subframe in the repetition period of the related art.

As described above, in the related art, the multicast transmission is provided for a normal terminal. However, the multicast transmission is not provided for the BL terminal, the CE terminal, or the NB-IoT terminal. Accordingly, the BL terminal, the CE terminal, or the NB-IoT terminal which receives the data through repetition hardly obtains the SC-MCCH using the related art method. Specifically, when the SC-MCCH is changed due to session start, the terminal does not detect the change, so that it is difficult to receive the SC-PTM based multicast data.

In order to solve the above-mentioned problem, an object of the exemplary embodiment of the present disclosure is to provide a method and an apparatus for providing multicast transmission to an NB-IoT terminal. Specifically, an object of the exemplary embodiment is to provide a notification method and apparatus to the BL terminal, the CE terminal, or the NB-IoT terminal according to the SC-MCCH change.

When a terminal interested in MBMS service reception through SC-MRB enters a cell which broadcasts system information block type 20, the terminal applies a SC-MCCH information obtaining procedure.

According to the related art, the terminal may identify SC-MCCH transmission on the PDCCH using single cell RNTI SC-RNTI. In order to address the SC-MCCH which is broadcasted on the DL-SCH, the SC-RNTI is used for the PDCCH linked to the DL-SCH. The base station broadcasts information for receiving SC-MCCH information through system information block type 20. Information included in the system information block type 20 includes i) sc-mcch Repetition Period information which defines SC-MCCH information transmitting interval, i) sc-mcch-Offset which instructs a wireless frame in which the SC-MCCH is scheduled, ii) sc-mcch-FirstSubframe information indicating a first subframe in which the SC-MCCH is scheduled, and iii) sc-mcch duration information indicating a duration when the SC-MCCH may be scheduled starting from the subframe indicated by sc-mcch-FirstSubFrame. Detailed definition thereof will be represented in Table 1.

TABLE 1

SystemInformationBlockType20 field descriptions sc-mcch-ModificationPeriod

Defines periodically appearing boundaries, i.e. radio frames for which SFN mod sc-mcch-ModificationPeriod = 0. The contents of different transmissions of SC-MCCH information can only be different if there is at least one such boundary in-between them. Value rf2 corresponds to 2 radio frames, value rf4 corresponds to 4 radio frames and so on.
sc-mcch-duration Indicates, starting from the subframe indicated by sc-mcch-FirstSubframe, the duration during which SC-MCCH may be scheduled in non-MBSFN subframes. Absence of this IE means that SC-MCCH is only scheduled in the subframe indicated by sc-mcch-FirstSubframe.
sc-mcch-Offset Indicates, together with the sc-mcch-RepetitionPeriod, the radio frames in which SC-MCCH is scheduled i.e. SC-MCCH is scheduled in radio frames
for which: SFN mod sc-mcch-RepetitionPeriod = sc-mcch-Offset.
sc-mcch-FirstSubframe Indicates the first subframe in which SC-MCCH is scheduled
sc-mcch-RepetitionPeriod Defines the interval between transmissions of SC-MCCH information, in radio frames. Value rf2 corresponds to 2 radio frames, rf4 corresponds to 4 radio frames and so on.

In the related art, a MTC physical downlink control channel MPDCCH is used for a bandwidth-reduced operation and common signaling and terminal specified signaling are transported. MPDCCH supports RA-RNTI, SI-RNTI, P-RNTI, C-RNTI, temporary C-RNTI, and SPS C-RNTI.

In the related art, a narrowband physical downlink control channel (NPDCCH) is located in an available symbol of the configured subframe with respect to the NB-IoT. The NPDCCH supports C-RNTI, Temporary C-RNTI, P-RNTI, and RA-RNTI.

In the related art, a downlink scheduling technology is applied to the NB-IoT, as follows.

Scheduling information for the downlink data is transmitted on a downlink physical control channel NPDCCH. The scheduled downlink data is transmitted on a shared data channel NPDSCH.

Only cross-subframe scheduling is supported, cross-carrier scheduling is not supported. The transmission duration in number of sub-frames for the NPDCCH and the NPDSCH is variable.

The transmission duration in number of sub-frames is semi-static for the NPDCCH and is indicated for the NPDSCH as a part of the scheduling information transmitted on the NPDCCH.

The start time of the NPDSCH relative to the NPDCCH is signaled as a part of the scheduling message.

Hereinafter, a method for notifying SC-MCCH changes to the BL terminal, the CE terminal, or the NB-IoT terminal according to embodiments of the present disclosure will be described in detail. The following methods may be individually used or combined with each other. For the convenience of description, hereinafter, the BL terminal, the CE terminal, or the NB-IoT terminal will be referred to as a terminal.

Method for Indicating SC-MCCH Change Notification Information by Defining an Information Element on System Information The multicast transmission for the BL terminal, the CE terminal, or the NB-IoT terminal is rarely generated as compared with data transmission such as firmware upgrade. Therefore, the information element is defined on the system information to indicate SC-MCCH change notification information.

A base station defines SC-MCCH change notification/change notification information element on the system information to transmit the SC-MCCH change notification. For example, the base station may include a SC-MCCH change notification information element for the BL terminal or the CE terminal on system information block type 20 (SystemInformationBlockType20) or (SystemInformationBlockType20-NB) including information required to obtain control information linked to MBMS transmission which uses the SC-PTM.

For another example, the base station may include a SC-MCCH change notification information element for the NB-IoT terminal on system information block type 20 (SystemInformationBlockType20) or (SystemInformationBlockType20-NB) including information required to obtain control information linked to MBMS transmission which uses the SC-PTM.

Method for Defining SC-MCCH Message Type to Indicate SC-MCCH Change Notification The base station may define a new SC-MCCH message type for indicating SC-MCCH change to provide SC-MCCH change notification information. For example, the base station may define a new SC-MCCH message (for example, SC-MCCH change notification message) which is distinguished from an existing SC-MCCH message (SCPTMConfiguration message) to notify the SC-MCCH change. For another example, the base station may multiplex the SCPTMConfiguration message and the SC-MCCH change notification message to transmit the messages. For still another example, the base station may overlap the SCPTMConfiguration message and the SC-MCCH change notification message on a wireless resource (frequency/time) to transmit the messages. For still another example, the base station may separately transmit the SCPTMConfiguration message and the SC-MCCH change notification message so as not to overlap on a wireless resource (frequency/time).

Method for Providing Detailed Scheduling Information on System Information for SC-MCCH Change Notification The base station may transmit SC-MCCH change notification/change notification information within a modification period (repeatedly at a predetermined period or by providing detailed scheduling information, designating a specific area, or providing detailed scheduling information through PDSCH/NPDSCH/MPDSCH). The base station may transmit SC-MCCH for a SC-PTM capable BL terminal, CE terminal, or the NM-IoT terminal without using PDCCH.

For example, the base station may include detailed time/frequency domain scheduling information for receiving/obtaining the SC-MCCH change notification information for the BL terminal or the CE terminal on system information block type 20 (SystemInformationBlockType20) or (SystemInformationBlockType20-NB) including information required to obtain control information linked to MBMS transmission which uses the SC-PTM or an arbitrary system information block type (for the convenience of description, which will be referred to as the system information block type 20 or included in other system information block type, which is also included in the scope of the present disclosure).

For example, the base station may include narrowband (index) information for broadcasting SC-MCCH change notification information to the BL terminal and a terminal which supports the CE through the system information block type 20.

For another example, the base station may include frequency hopping configuration information for broadcasting SC-MCCH change notification information to the BL terminal and a terminal which supports the CE through the system information block type 20.

For another example, the base station may include transmission block size (TBS) information for broadcasting SC-MCCH change notification information to the BL terminal and a terminal which supports the CE through the system information block type 20.

For another example, the base station may include SC-MCCH change notification repetition period configuration information for broadcasting SC-MCCH change notification information to the BL terminal and a terminal which supports the CE through the system information block type 20.

For another example, the base station may include SC-MCCH repetition period configuration information for broadcasting SC-MCCH change notification information to the BL terminal and a terminal which supports the CE through the system information block type 20.

For another example, the base station may include window period information for broadcasting SC-MCCH change notification information to the BL terminal and a terminal which supports the CE through the system information block type 20.

For another example, the base station may include window length for broadcasting SC-MCCH change notification information to the BL terminal and a terminal which supports the CE through the system information block type 20.

For another example, the base station may include wireless frame offset information on a window for broadcasting broadcast SC-MCCH change notification information to the BL terminal and a terminal which supports the CE through the system information block type 20.

For another example, the base station may include repetition pattern information (for example, every second wireless frame or every fourth wireless frame) for broadcasting SC-MCCH change notification information to the BL terminal and a terminal which supports the CE through the system information block type 20. For example, the repetition pattern may indicate a wireless frame in the repetition period.

For another example therefor, the base station may include detailed time/frequency domain scheduling information for receiving/obtaining SC-MCCH change notification information for the NB-IoT terminal on system information block type 20 SystemInformationBlockType20 or SystemInformationBlockType20-NB including information required to obtain control information linked to MBMS transmission which uses the SC-PTM.

For example, the base station may include transmission block size information used to broadcast the SC-MCCH change notification information to the NB-IoT terminal through the system information block type 20.

For another example, the base station may include repetition period information for broadcasting for broadcasting SC-MCCH change notification information to the BL terminal and a terminal which supports the CE through the system information block type 20.

For another example, the base station may include repetition duration information for broadcasting SC-MCCH change notification information to the BL terminal and a terminal which supports the CE through the system information block type 20.

For example, the base station may include window period information for broadcasting the SC-MCCH change notification information to the NB-IoT terminal through the system information block type 20.

For example, the base station may include window length information for broadcasting the SC-MCCH change notification information to the NB-IoT terminal through the system information block type 20.

For example, the base station may include repetition period information for broadcasting the SC-MCCH change notification information to the NB-IoT terminal through the system information block type 20.

For example, the base station may include repetition duration information for broadcasting the SC-MCCH change notification information to the NB-IoT terminal through the system information block type 20.

For example, the base station may include wireless frame offset information for broadcasting the SC-MCCH change notification information to the NB-IoT terminal through the system information block type 20.

For example, the base station may include first subframe/subframe offset/start subframe information for broadcasting the SC-MCCH change notification information to the NB-IoT terminal through the system information block type 20.

For example, the base station may include valid downlink subframe bitmap information for broadcasting the SC-MCCH change notification information to the NB-IoT terminal through the system information block type 20.

For another example, the base station may include repetition pattern information (for example, every second wireless frame or every fourth wireless frame) for broadcasting SC-MCCH change notification information to the NB-IoT terminal through the system information block type 20. For example, the repetition pattern may indicate a wireless frame in the repetition period.

For another example therefor, the above-described system information block type 20 is independently scheduled from the system information block type (SystemInformationBlockType20) of the related art (for a normal LTE terminal) to be provided as separated/distinguished message SystemInformationBlockType20-BR or SystemInformationBlockType20-NB.

Hereinafter, a receiving operation of a BL terminal, a CE terminal, or an NB-IoT terminal will be described.

For example, when the terminal enters a cell which broadcasts a system information block type 20 (for example, SystemInformationBlockType20-BR or SystemInformationBlockType20-NB), the terminal may receive and accumulate SC-MCCH change notification information on DL-SCH on a narrowband which is provided by narrowband information for broadcasting SC-MCCH change notification information from the start of the window to successful decoding of the accumulated SC-MCCH change notification information transmission.

For another example, when the terminal enters a cell which broadcasts a system information block type 20 (for example, SystemInformationBlockType20-BR or SystemInformationBlockType20-NB), the terminal may receive and accumulate SC-MCCH change notification information on DL-SCH on a narrowband which is provided by narrowband information for broadcasting SC-MCCH change notification information in a wireless frame by repetition pattern information and a subframe according to subframe information provided by downlink subframe bit map information.

For another example, when the terminal enters a cell which broadcasts a system information block type 20 (for example, SystemInformationBlockType20-BR or SystemInformationBlockType20-NB), the terminal may receive and accumulate SC-MCCH change notification information on DL-SCH from the start of the window to the end of the window length.

For another example, when the terminal enters a cell which broadcasts a system information block type 20 (for example, SystemInformationBlockType20-BR or SystemInformationBlockType20-NB), the terminal may receive and accumulate SC-MCCH change notification information on DL-SCH in a wireless frame by repetition pattern information and a subframe according to subframe information provided by downlink subframe bit map information.

For another example, when the terminal enters a cell which broadcasts a system information block type 20 (for example, SystemInformationBlockType20-BR or SystemInformationBlockType20-NB), the terminal may receive and accumulate the SC-MCCH change notification information, starting from a wireless frame provided in a wireless frame offset of the window/a repeated pattern wireless frame in the next repetition period/a wireless frame provided in the valid downlink subframe bit map to successful decoding of the accumulated SC-MCCH message excluding subframe used to transmit NPSS, NSSS, MasterinformationBlock-NB and SystemInformationBlockType1-NB.

For another example, when the decoding is not performed using SC-MCCH change notification information which is accumulated to the end of the window, the terminal repeatedly receives and transmits SC-MCCH change notification information on the DL-SCH in the next SC-MCCH change notification window occasion.

Method for Performing SC-MCCH Change Notification by Defining SC-MCCH Change Notification Information in SC-MCCH Message The base station may indicate SC-MCCH change notification by defining SC-MCCH change notification information in the existing SC-MCCH message SCPTMConfiguration. The base station defines an information element for indicating SC-MCCH change notification in the SCPTM-Configuration message and indicates the information element to the terminal.

Method for Identifying (Indicating SC-MCCH Change Notification Section) SC-MCCH Change Notification on PDCCH Using SC-N-RNTI When the terminal is configured to decode CRC scrambled PDCCH (hereinafter, for the convenience of description, referred to as PDCCH, but this may be MPD-CCH or NPDCCH) by the SC-N-RNTI by the upper layer, the terminal needs to decode PDCCH.

A SC-PTM capable BL terminal, CE terminal, or NB-IoT terminal may identify the SC-MCCH change notification by the SC-N-RNTI on the PDCCH/MPDCH/NPDCCH. The base station may transmit the SC-MCCH change notification information (which is scrambled by the SC-N-RNTI) onto the PDCCH.

The SC-MCCH information change may be generated in a predetermined frequency area/wireless frame/subframe pattern. Alternatively, the SC-MCCH information change may be generated starting from a predetermined frequency area/wireless frame/subframe pattern. The same SC-MCCH information may be transmitted several times by scheduling, in the modification period. A boundary of the modification period is defined by a SFN value in which SFN mod m=0. Here, m represents a number of wireless frames which configure the modification period. When the H-SFN is provided in the system information (SystemInformationBlockType1-BR) for the BL terminal or the CE terminal, the boundary of the modification period for the BL terminal or the CE terminal is defined by the SFN value in which (H-SFN*1024+SFN) mod m=0. The H-SFN is always provided for the NB-IoT. Further, the boundary of the modification period is defined by the SFN value in which (H-SFN*1024+SFN) mod m=0.

The modification period may be configured by the system information block type 20 SystemInformationBlockType20 or SystemInformationBlockType20-NB containing information required to obtain control information linked to the MBMS transmission using SC-PTM.

When the network (base station) changes (partially) SC-MCCH information, the network may notify the change to the terminal in a specific wireless frame/subframe. The network transmits updated/changed SC-MCCH in the next modification period.

For example, the network may indicate PDCCH repetition number/duration/period (a maximum repetition number/duration/period for a PDCCH common search space as an example, and valid subframe repetition number/duration/period for a PDCCH common search space For another example) for SC-MCCH change notification in addition to the first subframe sc-mcch-FirstSubframe which may be used for SC-MCCH transmission in the SC-MCCH transmission period/repetition period/window. The terminal may recognize that the SC-MCCH change is indicated from the first subframe or to successful decoding of the accumulated SC-MCCH change notification transmission (for example, if the terminal checks that an LSB bit of 8 bit bitmap is set to be '1" by decoding the PDCCH or checks the SC-MCCH change notification).

For another example, the network may define and provide a section/duration/period for SC-MCCH change notification which is different from the SC-MCCH repetition period. For another example, the network may define and provide a section/duration/period for SC-MCCH change notification which is different from the SC-MCCH period for SC-MCCH transmission. For another example, the network may define and provide a section/duration/period for SC-MCCH change notification which is independent from the SC-MCCH period for SC-MCCH transmission.

For another example, the network may separately provide section/duration/period for SC-MCCH change notification and section/duration/period for SC-MCCH transmission in the SC-MCCH transmission period/repetition period/window. As an example, the network separately provides the first subframe (or wireless frame+offset) and maximum repetition number/duration for SC-MCCH change notification and the first subframe (or wireless frame+offset) and maximum repetition number/duration for SC-MCCH transmission. The network further provides valid wireless frame/subframe pattern information. The terminal may recognize that the SC-MCCH change is indicated from the first subframe for the SC-MCCH change notification or to successful decoding of the accumulated SC-MCCH change notification transmission (for example, if the terminal checks that an LSB bit of 8 bit bitmap is set to be "1" by decoding the PDCCH or checks the SC-MCCH change notification).

For another example, when the terminal receives/obtains/decodes/checks/recognizes the SC-MCCH change notification, a terminal which is interested in reception of the MBMS service to be transmitted using the SC-PTM obtains/receives new/changed/updated SC-MCCH. As an example therefor, the terminal obtains/receives the new/changed/updated SC-MCCH in the next modification period. For another example therefor, the terminal obtains/receives the new/changed/updated SC-MCCH from the first subframe which may be used for SC-MCCH transmission in the next modification period. For another example therefor, the terminal obtains/receives the new/changed/updated SC-MCCH starting from the first subframe of the section/duration/period for the SC-MCCH transmission which is different from the section/duration/period for the SC-MCCH change notification in the next modification period. For another example therefor, when the terminal receives/obtains/decodes/checkes/recognizes the SC-MCCH change notification, the terminal obtains/receives the new/changed/updated SC-MCCH starting from the section/duration/period for the next SC-MCCH transmission of the section/duration/period for the SC-MCCH change notification which is received/obtained/decoded/checked/recognized. For another example therefor, when the terminal receives/obtains/decodes/checks/recognizes the SC-MCCH change notification, the terminal obtains/receives the new/changed/updated SC-MCCH starting from the next received/obtained/decoded/checked/recognized subframe. For another example therefor, when the terminal receives/obtains/decodes/checks/recognizes the SC-MCCH change notification, the terminal obtains/receives the new/changed/updated SC-MCCH starting from the same received/obtained/decoded/checked/recognized subframe. For another example therefor, when the terminal receives/obtains/decodes/checkes/recognizes the SC-MCCH change notification, the terminal obtains/receives the new/changed/updated SC-MCCH starting from a next subframe in which the section/duration/period for the SC-MCCH change notification which is received/obtained/decoded/checked/recognized ends. For another example therefor, when the terminal receives/obtains/decodes/checkes/recognizes the SC-MCCH change notification, the terminal obtains/receives the new/changed/updated SC-MCCH starting from the first subframe of the separated section/duration/period for the SC-MCCH transmission in the same transmission period/repetition period/window. To this end, the section for the SC-MCCH change notification may be generated earlier than the section/duration/period for the SC-MCCH transmission.

For another example therefor, when the terminal receives/obtains/decodes/checkes/recognizes the SC-MCCH change notification, the terminal obtains/receives the new/changed/updated SC-MCCH starting from the first subframe of the section/duration/period for the next SC-MCCH transmission.

The information for the above-described operation may be included in the system information block type 20 SystemInformationBlockType20 or SystemInformationBlockType20-NB containing information required to obtain control information linked to the MBMS transmission using SC-PTM. For another example, the above-described information may be included in the system information block type 2 SystemInformationBlockType2 or SystemInformationBlockType2-NB containing wireless resource configuration information common for all terminals. For another example, this may be indicated to the terminal by dedicated signaling. For another example, this may be indicated to the terminal by dedicated signaling of the base station in accordance with the request of the terminal. For another example, in the subframe number for the NPDCCH, the terminal may use a transmission duration value.

Method for Transmitting Indication Information which Identifies SC-MCCH Change Notification on PDCCH Using SC-RNTI When the terminal is configured to decode CRC scrambled PDCCH by the upper layer, the terminal needs to decode PDCCH. Herein, the CRC scrambled PDCCH is scrambled by the SC-RNTI. For the convenience of description, a term PDCCH is as a representative term of MPDCCH and NPDCCH.

A SC-PTM capable BL terminal, CE terminal, or NB-IoT terminal may identify the SC-MCCH change notification by the SC-RNTI on the PDCCH/MPDCH/NPDCCH. The base station may transmit the SC-MCCH change notification information (which is scrambled by the SC-RNTI) onto the PDCCH.

For example, SC-MCCH change notification may be directly indicated through DCI information (or a DCI format) for directly indicating the SC-MCCH change notification. For example, a new DCI format is defined. The new DCI format is different from DCI formats N1 and N2 used for the NB-IoT terminal of the related art. For example, information for indicating the SC-MCCH change notification may be included on the DCI for SC-MCCH. For another example, information for indicating the SC-MCCH change notification may be included in the DCI. For another example, an information element for distinguishing direct indication for the SC-MCCH change notification may be included. For example, a flag (one bit) for distinguishing SC-MCCH/direct indication may be included. A value of zero (or a value of 1) is used for direct indication and a value of 1 (or a value of zero) is used for SC-MCCH. For another example, a bit set to bit/bitmap/8 bits/specific value which provides direct indication of the SC-MCCH change notification may be provided.

The terminal may receive the SC-MCCH change notification through direct indication information transmitted on the NPDCCH using the SC-RNTI. The terminal may distinguish and receive the SC-MCCH change notification information through the information element for directly distinguishing the SC-MCCH and the SC-MCCH change notification using the SC-RNTI.

For another example, the base station may indicate the SC-MCCH change notification section when the terminal receives the SC-MCCH change notification through the system information or the SC-MCCH information.

The SC-MCCH information change may be generated in a predetermined frequency area/wireless frame/subframe pattern. Alternatively, the SC-MCCH information change may be generated starting from a specific frequency area/wireless frame/subframe pattern. The same SC-MCCH information may be transmitted several times in the modification period by scheduling. A boundary of the modification period is defined by a SFN value in which SFN mod m=0. Here, m represents a number of wireless frames which configure the modification period. When the H-SFN is provided in the system information (SystemInformation-BlockType1-BR) for the BL terminal or the CE terminal, the boundary of the modification period for the BL terminal or the CE terminal is defined by the value of SFN in which (H-SFN*1024+SFN) mod m=0. The H-SFN is always provided for the NB-IoT. Further, the boundary of the modification period is defined by the SFN value in which (H-SFN*1024+SFN) mod m=0.

The modification period may be configured by the system information block type 20 (SystemInformationBlockType20) or (SystemInformationBlockType20-NB) containing information required to obtain control information linked to the MBMS transmission using SC-PTM or the SC-MCCH.

When the network (base station) changes (partially) SC-MCCH information, the network may notify the change to the terminal in a predetermined wireless frame/subframe. The network transmits updated/changed SC-MCCH in the next modification period.

For example, the network indicates PDCCH repetition number/duration/period (a maximum repetition number/duration/period for a PDCCH common search space as an example, and valid subframe repetition number/duration/period for a PDCCH common search space For another example) for the SC-MCCH change notification in addition to the first subframe for SC-MCCH change notification. The terminal may recognize that the SC-MCCH change is indicated from the first subframe or to successful decoding of the accumulated SC-MCCH change notification transmission (for example, if the terminal checks that 8 bit bitmap (or direct indication information) is set to be a SC-MCCH change notification value by decoding the PDCCH or checks the SC-MCCH change notification).

For another example, the network may define and provide a section/duration/period for SC-MCCH change notification which is different from the SC-MCCH repetition period. For another example, the network may define and provide a section/duration/period for SC-MCCH change notification which is different from the SC-MCCH period for SC-MCCH transmission. For another example, the network may define and provide a section/duration/period for SC-MCCH change notification which is independent from the SC-MCCH period for SC-MCCH transmission.

For another example, the network separates section/duration/period for SC-MCCH change notification and section/duration/period for SC-MCCH transmission to be provided in the SC-MCCH transmission period/repetition period/window. For example, the network separately provides the first subframe (or wireless frame+offset) and maximum repetition number/duration for SC-MCCH change notification and the first subframe (or wireless frame+offset) and maximum repetition number/duration for SC-MCCH transmission. The network may provide valid wireless frame/subframe pattern information in addition to this. The terminal may recognize that the SC-MCCH change is indicated from the first subframe for the SC-MCCH change notification or to successful decoding of the accumulated SC-MCCH change notification transmission (for example, if the terminal checks that 8 bit bitmap (or direct indication information) is set to be a SC-MCCH change notification value by decoding the PDCCH or checks the SC-MCCH change notification).

For another example, when the terminal receives/obtains/decodes/checks/recognizes the SC-MCCH change notification, a terminal interested in reception of the MBMS service to be transmitted using the SC-PTM obtains/receives new/changed/updated SC-MCCH. For example, the terminal obtains/receives the new/changed/updated SC-MCCH in the next modification period. For another example, the terminal obtains/receives the new/changed/updated SC-MCCH from the first subframe which may be used for SC-MCCH transmission in the next modification period. For another example, the terminal obtains/receives the new/changed/updated SC-MCCH starting from the first subframe of the section/duration/period for the SC-MCCH transmission which is different from the section/duration/period for the SC-MCCH change notification in the next modification period. For another example, when the terminal receives/obtains/decodes/checkes/recognizes the SC-MCCH change notification, the terminal obtains/receives the new/changed/updated SC-MCCH starting from the section/duration/period for the next SC-MCCH transmission of the section/duration/period for the SC-MCCH change notification which is received/obtained/decoded/checked/recognized. For another example therefor, when the terminal receives/obtains/decodes/checks/recognizes the SC-MCCH change notification, the terminal receives/obtains/decodes/checkes/recognizes the SC-MCCH change notification, the new/changed/updated SC-MCCH starting from the next received/obtained/decoded/checked/recognized subframe. For another example therefor, when the terminal receives/obtains/decodes/checks/recognizes the SC-MCCH change notification, the terminal obtains/receives the new/changed/updated SC-MCCH starting from the same received/obtained/decoded/checked/recognized subframe. For another example therefor, when the terminal receives/obtains/decodes/checks/recognizes the SC-MCCH change notification, the terminal obtains/receives the new/changed/updated SC-MCCH starting from a next subframe in which the section/duration/period for the SC-MCCH change notification which is received/obtained/decoded/checked/recognized ends. For another example therefor, when the terminal receives/obtains/decodes/checks/recognizes the SC-MCCH change notification, the terminal obtains/receives the new/changed/updated SC-MCCH starting from the first subframe of the separated section/duration/period for the SC-MCCH transmission in the same transmission period/repetition period/window. To this end, the section for the SC-MCCH change notification may be generated earlier than the section/duration/period for the SC-MCCH transmission.

For another example therefor, when the terminal obtains/receives the SC-MCCH change notification, the terminal obtains/receives the new/changed/updated SC-MCCH starting from the first subframe of the section/duration/period for the next SC-MCCH transmission.

The information for the above-described operation may be included in the system information block type 20 SystemInformationBlockType20 or SystemInformationBlockType20-NB containing information required to obtain control information linked to the MBMS transmission using SC-PTM. For another example, the above-described information may be included in the system information block type 2 SystemInformationBlockType2 or SystemInformationBlockType2-NB containing wireless resource configuration information common for all terminals. For another example, this may be indicated to the terminal by dedicated signaling. For another example, this may be indicated to the terminal by dedicated signaling of the base station in accordance with the request of the terminal. For another example, in the subframe number for the NPDCCH, the terminal may use a transmission duration value.

The terminal may receive the SC-MCCH change notification through direct indication information transmitted on the NPDCCH using the SC-RNTI.

Method for Performing SC-MCCH Change Notification Through Paging

The base station may notify SC-MCCH change through a paging message. For example, the SC-MCCH change notification information is defined in the paging message to indicate the SC-MCCH change notification to the terminal. For another example, a DCI (for example, a DCI format N2) for paging may include indication information therefor. For example, as it will be described below, information for indicating the SC-MCCH change notification may be included on the DCI for paging. For another example, a bit value which is different from system information update is defined in 8 bit for the direct indication information to indicate the SC-MCCH change notification. For example, the SC-MCCH change may be notified using one of remaining bit values excluding bit 1 and bit 2, as it will be described below.

Direct indication information defined in the NB-IoT is transmitted on the NPDCCH using P-RNTI. However, the direct indication information is transmitted without having a linked narrowband paging message. The DCI format N2 is used for paging and direct indication. The following information is defined by the DCI format N2.

A flag (1 bit) for distinguishing paging/direct indication and the value of zero are used for direct indication, and the value of 1 is used for paging. When the flag is zero, 8 bit indicating the direct indication information provides direct indication which is in different field from the system information update. For example, bit 1 indicates system information modification (systemInfoModification) and bit 2 indicates eDRX system information modification, and the remaining values are not used.

When the flag is 1, resource allocation, modulation and coding scheme (MCS), a repetition number, and a DCI subframe repetition number are transmitted.

The terminal may receive the SC-MCCH change notification through direct indication information transmitted on the NPDCCH using the P-RNTI.

As described above, in accordance with the exemplary embodiment, SC-MCCH change may be effectively notified to the BL terminal, the CE terminal, or the NB-IoT terminal. By doing this, the above-described terminal may effectively receive multicast data.

A terminal and a base station device which may implement a part or all of the exemplary embodiments described with reference to FIGS. 1 to 3 will be described again with reference to the drawings.

Figure 4:
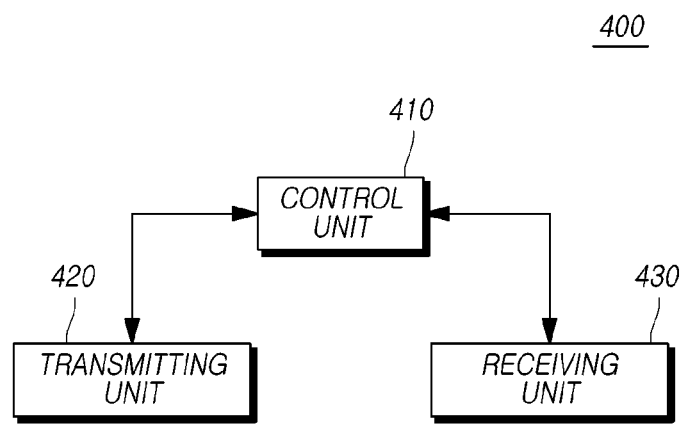
FIG. 4 is a block diagram illustrating a configuration of a terminal according to an exemplary embodiment.

FIG. 4 is a block diagram illustrating a terminal according to an exemplary embodiment.

Referring to FIG. 4, when discontinuous reception DRX is configured for group radio network temporary identifier (G-RNTI), a terminal 400 which receives multicast data includes a control unit 410 and a receiving unit 430. The control unit 410 controls an operation of at least one of a SC-PTM onduration timer and a SC-PTM inactivity timer (InactivityTimer) when a medium access control (MAC) entity of the terminal starts single cell-point to multipoint (SC-PTM) onduration timer (onDurationTimer) and monitors a physical downlink control channel (PDCCH) during the active time. PDCCH includes information indicating downlink transmission. The receiving unit 430 repeatedly receives multicast data through physical downlink shared channel PDSCH of one or more subframes.

For example, when DRX is configured for the G-RNTI, the control unit 410 may start the SC-PTM onduration timer to start an active time. The G-RNTI is an identifier for receiving the SC-MTCH. When the DRX is configured for the G-RNTI, the MAC entity of the terminal may start the SC-PTM onduration timer to receive the SC-MTCH.

Further, the control unit 410 may monitor the downlink control channel at an active time while an onduration timer is running. The active time refers to a time while a SC-PTM onduration timer is running or while an SC-PTM inactivity timer is running.

In the meantime, when the control unit 410 identifies that information indicating downlink transmission is included in the PDCCH while monitoring the PDCCH during the active time, operation of at least one of the SC-PTM onduration timer and the SC-PTM inactivity timer may be changed.

For example, when information indicating downlink transmission is included in the PDCCH, the control unit 410 may control to stop the operations of the SC-PTM onduration timer and the SC-PTM inactivity timer. That is, when information indicating downlink transmission is detected as a result of monitoring the PDCCH, the control unit 410 may stop the started SC-PTM onduration timer and SC-PTM inactivity timer.

For another example, when information indicating downlink transmission is included in the PDCCH, the control unit 410 may start or restart the SC-PTM inactivity timer. In this case, the starting or restarting of the SC-PTM inactivity timer may be performed at a last subframe in which multicast data is repeatedly received. That is, the control unit 410 may control the SC-PTM inactivity timer to be started or restarted in the last subframe in which the multicast data is repeatedly received.

For another example, a timer control operation may be divided according to a type of the terminal, a category of the terminal or a capability of the terminal. For example, when the terminal is allowed to access a network service in which a channel bandwidth is restricted to be 200 kHz or lower (for example, a terminal is set to receive DCI through an NPDCCH), if information indicating downlink transmission is included in the PDCCH, the control unit 410 may stop the operations of the SC-PTM onduration timer and the SC-PTM inactivity timer. When the terminal is set to operate at a bandwidth restricted to six physical resource blocks (PRB) (for example, a terminal set to receive a DCI through the MPDCCH), if the information indicating downlink transmission is included in the PDCCH, the control unit 410 may start or restart the SC-PTM inactivity timer. A starting or restarting timing may be performed in the last subframe in which the multicast data is repeatedly received. That is, in the case of the NB-IoT terminal, when the information indicating downlink transmission is included in the PDCCH, the control unit 410 stops the operations of the SC-PTM onduration timer and the SC-PTM inactivity timer. Further, in the case of the BL or CE terminal, when the information indicating downlink transmission is included in the PDCCH, the control unit 410 start or restart the SC-PTM inactivity timer.

In addition, the control unit 410 effectively receives a multicast traffic channel using the SC-PTM transmission method according to the above-described exemplary embodiments and controls an overall operation of the terminal 400 in accordance with reception of the change notification of the multicast control information.

The receiving unit 430 receives the SC-MTCH through a downlink data channel to receive multicast data. Since a terminal which receives the multicast data is a terminal which is requested to have enhanced coverage, low cost, or low power consumption operation as described above, the multicast data may be repeatedly received through a plurality of subframes.

Further, the receiving unit 430 receives the SC-PTM onduration timer and the SC-PTM inactivity timer through a corresponding PDSCH by decoding the PDCCH instructed in accordance with single cell-multicast control channel (SC-MCCH) scheduling information. Further, the receiving unit 430 may receive the SC-MCCH scheduling information through system information.

Here, the PDCCH indicated according to the SC-MCCH scheduling information may include change notification information for change notification of multicast control information. For example, the change notification information may be decoded through a single cell-radio network temporary identifier (SC-RNTI). For another example, the change notification information is configured by one bit to be received by the terminal.

The terminal 400 may identify whether multicast control information is changed through a PDCCH indicated through the system information and may receive the changed SC-PTM onduration timer and SC-PTM inactivity timer.

The receiving unit 430 receives downlink control information, data, and messages through a corresponding channel from the base station. The transmitting unit 420 transmits uplink control information, data, and messages through a corresponding channel to the base station.

Figure 5:
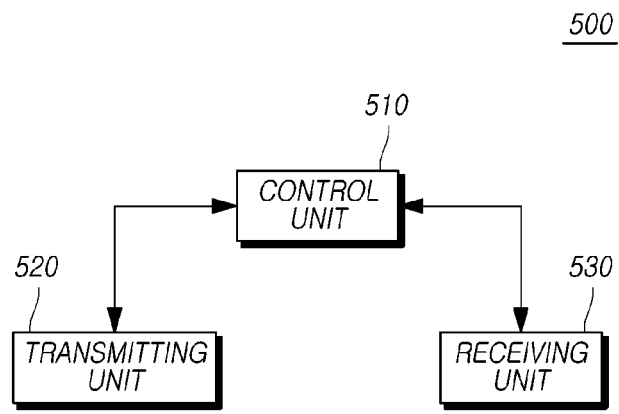
FIG. 5 is a block diagram illustrating a configuration of a base station according to an exemplary embodiment.

FIG. 5 is a block diagram illustrating a base station according to an exemplary embodiment.

Referring to FIG. 5, a base station 500 includes a control unit 510, a transmitting unit 520, and a receiving unit 530.

The control unit 510 effectively transmits a multicast traffic channel using a SC-PTM transmission method according to the above-described exemplary embodiments and controls an overall operation of the base station 500 in accordance with the notification of change of multicast control information to the terminal.

The transmitting unit 520 and the receiving unit 530 transmit and receive signals, messages, and data to and from the terminal.

Standard contents and standard documents mentioned in the above-described exemplary embodiments are omitted for simplicity of description of the specification and configure a part of the specification. Therefore, it should be interpreted that when partial contents of the standard contents and standard documents are added to the specification or described in the claims, it is also covered by the scope of the present disclosure.

It will be appreciated that various exemplary embodiments of the present disclosure have been described herein for purposes of illustration, and that various modifications, changes, and substitutions may be made by those skilled in the art without departing from the scope and spirit of the present disclosure. Therefore, the exemplary embodiments of the present disclosure are provided for illustrative purposes only but not intended to limit the technical spirit of the present disclosure. The scope of the technical spirit of the present disclosure is not limited thereto. The protective scope of the present disclosure should be construed based on the following claims, and all the technical concepts in the equivalent scope thereof should be construed as falling within the scope of the present disclosure.

What is claimed is:

1. A method for receiving multicast data by a terminal, the method comprising:
   starting a single cell-point to multipoint (SC-PTM) onduration timer (onDurationTimer) by a medium access control (MAC) entity of a terminal when discontinuous reception (DRX) is configured for a group-radio network temporary identifier (G-RNTI) wherein the SC- PTM onduration timer is defined for starting an active time for receiving single cell multicast traffic channel (SC-MTCH), and the G-RNTI is an identifier defined for receiving SC-MTCH;

monitoring a physical downlink control channel (PD-CCH) during an active time;

controlling at least one of the SC-PTM onduration timer and the SC-PTM inactivity timer (InactivityTimer) when the PDCCH includes information indicating downlink transmission; and repeatedly receiving the multicast data through a physical downlink shared channel (PDSCH) of one or more subframes.

2. The method according to claim 1, wherein the active time is a time while at least one of a SC-PTM onduration timer and an SC-PTM inactivity timer is running.

3. The method according to claim 1, wherein the controlling comprises: stopping the SC-PTM onduration timer and the SC-PTM inactivity timer.

4. The method according to claim 3, wherein the terminal is set to access a network service whose channel bandwidth is restricted to 200 kHz or lower.

5. The method according to claim 1, wherein the controlling comprises starting or restarting the SC-PTM inactivity timer.

6. The method according to claim 5, wherein the terminal is set to operate in a bandwidth restricted to six physical resource blocks (PRBs).

7. The method according to claim 5, wherein the controlling comprises, starting or restarting the SC-PTM inactivity timer in a last subframe in which the multicast data is repeatedly received.

8. The method according to claim 1, wherein:
the SC-PTM onduration timer and the SC-PTM inactivity timer are received through the PDSCH according to a decoding result of the PDCCH, which is indicated according to single cell-multicast control channel (SC-MCCH) scheduling information; and
the SC-MCCH scheduling information is received through system information.

9. The method according to claim 8, wherein the PDCCH indicated according to the SC-MCCH scheduling information includes change notification information for notifying change in multicast control information.

10. The method according to claim 9, wherein the change notification information is decoded through single cell-radio network temporary identifier (SC-RNTI).

11. The method according to claim 9, wherein the change notification information is configured by one bit.

12. The method according to claim 8, wherein the terminal is set to access a network service whose channel bandwidth is restricted to 200 kHz or lower or set to operate in a bandwidth restricted to six PRBs.

13. A terminal for receiving multicast data, the terminal comprising:
a processor comprising a control unit configured to i) start a single cell-point multipoint (SC-PTM) onduration timer through a medium access control (MAC) when discontinuous reception (DRX) is configured for group radio network temporary identifier (G-RNTI), ii) monitor a physical downlink control channel (PDCCH) during the active time, and iii) control at least one of the SC-PTM onduration timer and a SC-PTM inactivity timer when the PDCCH includes information indicating downlink transmission wherein the SC-PTM onduration timer is defined for starting an active time for receiving single cell multicast traffic channel (SC-MTCH), and the G-RNTI is an identifier defined for receiving SC-MTCH; and
a receiving unit configured to be controlled by the processor and repeatedly receive the multicast data through at least one subframe of a physical downlink shared channel (PDSCH).

14. The terminal according to claim 13, wherein the active time is a time while one of the SC-PTM onduration timer and the SC-PTM inactivity timer is running.

15. The terminal according to claim 13, wherein when the terminal is set to access a network service whose channel bandwidth is restricted to 200 kHz or lower, if the PDCCH includes information indicating downlink transmission, the control unit stops operations of the SC-PTM onduration timer and the SC-PTM inactivity timer.

16. The terminal according to claim 13, wherein when the terminal is set to operate in a bandwidth restricted to six physical resource blocks PRBs, if the PDCCH includes information indicating downlink transmission, the control unit starts or restarts the SC-PTM inactivity timer.

17. The terminal according to claim 16, wherein the control unit starts or restarts the SC-PTM inactivity timer in a last subframe in which the multicast data is repeatedly received.

18. The terminal according to claim 13, wherein:
the SC-PTM onduration timer and the SC-PTM inactivity timer are received through the PDSCH according to a decoding result of the PDCCH indicated according to single cell-multicast control channel (SC-MCCH) scheduling information; and
the SC-MCCH scheduling information is received through system information.

19. The terminal according to claim 18, wherein the PDCCH indicated according to the SC-MCCH scheduling information includes change notification information for notifying change in multicast control information.

20. The terminal according to claim 19, wherein the change notification information is decoded through single cell-radio network temporary identifier (SC-RNTI).

* * * * *